United States Patent
Marupaduga et al.

(10) Patent No.: US 9,490,534 B1
(45) Date of Patent: Nov. 8, 2016

(54) DYNAMIC OPTIMIZATION OF ANTENNA SYSTEMS

(71) Applicant: SPRINT COMMUNICATIONS COMPANY L.P., Overland Park, KS (US)

(72) Inventors: Sreekar Marupaduga, Overland Park, KS (US); Paul Jacob Sterchi, Lawrenceburg, IN (US); Matt Masters, Greenfield, IN (US)

(73) Assignee: Sprint Communications Company L.P., Overland Park, KS (US)

( * ) Notice: Subject to any disclaimer, the term of this patent is extended or adjusted under 35 U.S.C. 154(b) by 432 days.

(21) Appl. No.: 14/081,559

(22) Filed: Nov. 15, 2013

(51) Int. Cl.
*H01Q 3/00* (2006.01)
*H01Q 3/22* (2006.01)

(52) U.S. Cl.
CPC ........................ *H01Q 3/22* (2013.01)

(58) Field of Classification Search
CPC ....................................................... H01Q 3/08
USPC ........ 342/74, 359, 367, 372; 455/422.1, 423
See application file for complete search history.

(56) References Cited

U.S. PATENT DOCUMENTS

| | | | | |
|---|---|---|---|---|
| 8,897,767 B2 * | 11/2014 | Kojima | ............................ | 455/418 |
| 2012/0329449 A1 * | 12/2012 | Das | ................... | H04W 52/0206 455/423 |
| 2014/0162682 A1 * | 6/2014 | Tafreshi | ................ | H04W 24/02 455/456.1 |
| 2014/0293979 A1 * | 10/2014 | Gormley | ............... | H04W 24/02 370/338 |

* cited by examiner

*Primary Examiner* — Dao Phan

(57) ABSTRACT

Various methods and systems for dynamically optimizing the azimuth and tilt settings of antenna systems based on analyzing network parameters are provided. Analyzing network parameters may be by way of an automated feedback mechanism, where measurements for network parameters, including, for example, traffic patterns, radio channel conditions, capacity offload requirements and coverage requirements are received for one or more network cells. The network parameter measurements are associated with an antenna system of the one or more network cells. The network parameter measurements correspond to one or more network parameters each having a threshold level for optimal operation of the network. A determination is made that a network parameter measurement for at least one of the one or more network parameters meets a corresponding threshold level. An adjustment for the azimuth setting and a tilt setting of the antenna system is determined such that the antenna system is adjusted.

20 Claims, 6 Drawing Sheets

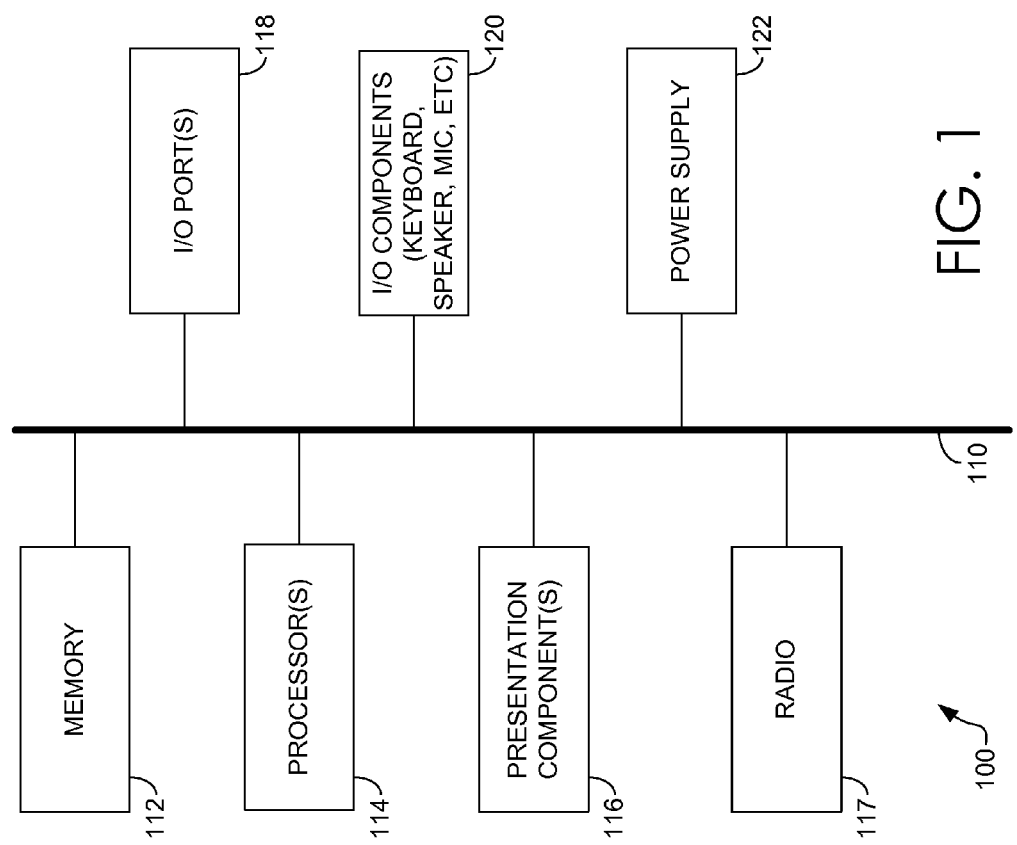

|   | BASELINE | AZIMUTH | TILT |
|---|---|---|---|
| A | x | y | |
| B | ... | ... | ... |
| C | ... | ... | ... |
| D | ... | ... | ... |

FIG. 3A

BASELINE A

| NETWORK PARAMETERS | BASELINE (0-100%) | NETWORK PARAMETER MEASUREMENTS | THRESHOLD | PRIORITY RANK |
|---|---|---|---|---|
| TRAFFIC PATTERN | 50% | 82% | ≥30 | 1 |
| RADIO CHANNEL CONDITIONS | 50% | 75% | ≥20 | 2 |
| CAPACITY OFFLOAD | 50% | 60% | ≥20 | 3 |
| COVERAGE REQUIREMENTS | 90% | 80% | ≤20 | 4 |

FIG. 3B

| TRAFFIC PATTERN CHANGE FROM BASELINE (%) | RADIO CHANNEL CONDITIONS CHANGE FROM BASELINE (%) | CAPACITY OFFLOAD CHANGE FROM BASELINE (%) | COVERAGE | AZIMUTH | TILT |
|---|---|---|---|---|---|
| >30 | SAME AS BASELINE | SAME AS BASELINE | COVERS >90% OF INTENDED USERS | YES | NO |
| <30 | SAME AS BASELINE | SAME AS BASELINE | COVERS >90% OF INTENDED USERS | NO | NO |
| >30 | >20 | >20 | COVERS >90% OF INTENDED USERS | YES | YES |
| >30 | >20 | >20 | COVERS <90% OF INTENDED USERS | YES | YES |
| >30 | <20 | <20 | COVERS <90% OF INTENDED USERS | YES | YES |

FIG. 3C

DYNAMIC OPTIMIZATION OF ANTENNA SYSTEMS

SUMMARY

A high-level overview of the invention is provided here to disclose and to introduce a selection of concepts that are further described below in the detailed description section. This summary is not intended to identify key features or essential features of the claimed subject matter, nor is it intended to be used as an aid in isolation to determine the scope of the claimed subject matter.

In brief and at a high level, this disclosure describes, among other things, systems and methods for dynamically optimizing the azimuth and tilt settings of antenna systems based on analyzing network parameters. Analyzing network parameters may be accomplished by an automated feedback mechanism where real-time measurements for network parameters are received for one or more network cells. Network parameters include, by way of example, traffic patterns, radio channel conditions, capacity offload requirements and coverage requirements. The network parameter measurements are associated with an antenna system of the network. The network parameter measurements correspond to one or more network parameters each having a threshold level for optimal operation of the network. The threshold level can be associated with a baseline antenna system setting. A determination is made that a network parameter measurement for at least one of the one or more network parameters meets a corresponding threshold level. As such, an adjustment for an azimuth setting and a tilt setting of the antenna system is determined. The azimuth setting and the tilt setting for the antenna system are adjusted using the determined adjustment settings.

BRIEF DESCRIPTION OF SEVERAL VIEWS OF THE DRAWINGS

Illustrative embodiments of the present invention are described in detail below with reference to the attached drawing figures, and wherein:

FIG. 1 depicts a block diagram of a mobile device in accordance with an embodiment of the present invention;

FIGS. 3A-3C depict a schematic illustrating a method for dynamically optimizing the azimuth and tilt settings of antenna systems based on analyzing network parameters, in accordance with an embodiment of the present invention;

DETAILED DESCRIPTION

Figure 2A:
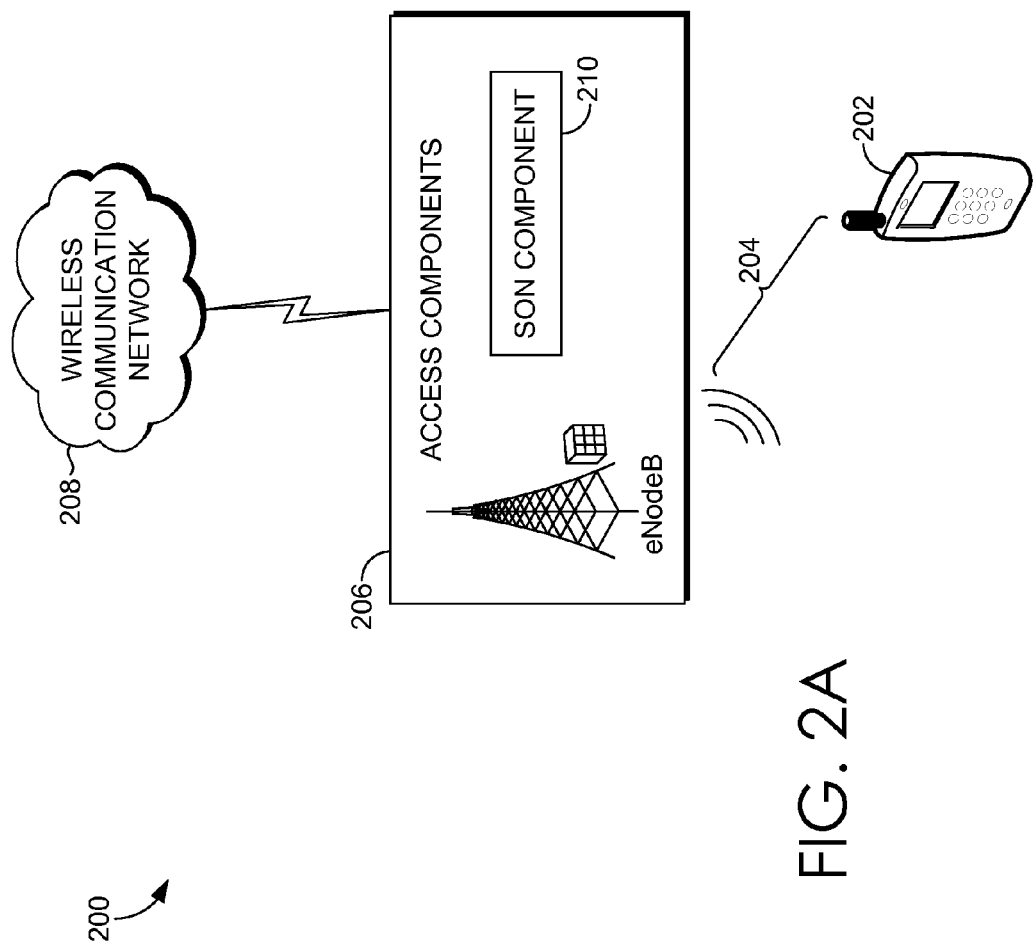
FIGS. 2A-2B depict an illustrative operating environment for carrying out embodiments of the present invention.

The subject matter of select embodiments of the present invention is described with specificity herein to meet statutory requirements. But the description itself is not intended to define what we regard as our invention, which is what the claims do. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention.

| | |
|---|---|
| BTS | Base Transceiver Station |
| CDMA | Code Division Multiple Access |
| EVDO | Evolved Data Optimized |
| GSM | Global System for Mobile communications (Groupe Spécial Mobile) |
| LTE | Long Term Evolution |
| PDA | Personal Data Assistant |
| RNC | Radio Network Controller |
| SON | Self-Organizing Networks |
| TDMA | Time Division Multiple Access |
| UMTS | Universal Mobile Telecommunications System |

For purposes of a detailed discussion below, a wireless communications network having one or more types of network cells is described. Further, while embodiments of the present invention may generally refer to the components described, it is understood that an implementation of the techniques described may be extended to cases with different components carrying out the steps described herein. It is contemplated that embodiments of the present invention may utilize different types of network parameters beyond the exemplary embodiments described herein.

Embodiments of our technology may be embodied as, among other things, a method, system, or set of instructions embodied on one or more computer-readable media. Computer-readable media include both volatile and nonvolatile media, removable and non-removable media, and contemplate media readable by a database, a switch, and various other network devices. Computer-readable media include media implemented in any way for storing information. Examples of stored information include computer-useable instructions, data structures, program modules, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

An antenna system may refer to an electrical device that converts electrical power to radio waves or vice versa. An antenna system can be used with radio transmitters or radio receivers. An antenna system can be made up of one or more antennas. Antenna systems include sector antennas that are directional microwave antennas with a sector-shaped radiation pattern. Antenna systems can be used for telecommunications, for example, wireless communications networks at base station sites. Antenna systems can also be used for other types of mobile communications, for example, in Wi-Fi networks. A wireless communications network includes cellular networks or mobile networks distributed over land areas called cells. Each cell can be served by one fixed-location transceiver, known as a cell site or base station. In a cellular network, for example, each cell may use a different set of frequencies from neighboring cells to avoid interference and provide guaranteed bandwidth within each cell.

Modern networks (e.g., heterogeneous networks) include different types of cells. At a basic level, heterogeneous networks provide for complementing high-power cells (e.g., macrocells) with low-power cells (e.g., femtocells and picocells). A macrocell is a cell in a network that provides radio coverage served by a high-power cellular base station (tower). A femtocell is a small, low-power cellular base station, typically designed for use in a home or small business. A femtocell may connect the service provider's wireless communications network via broadband to support several active mobile devices in a residential setting or enterprise setting. Similarly, a picocell is a small cellular base station typically covering a small area, such as in-building (e.g., offices, shopping malls, train stations) or in-aircraft. A picocell extends coverage to indoor areas where outdoor signals do not reach well, or add network capacity in areas with very dense phone usage. The concept of femtocells and picocells can be applied to different radio access technologies. For purposes of a detailed discussion, the femtocells and picocells will be discussed with reference to an LTE system. Thousands of femtocells and picocells inside a network area create optimization considerations, as such, optimizing network performance includes analyzing the macrocells, femtocells, and picocells network parameter measurements.

A network design process, for a wireless communications network or Wi-Fi network, consists of planning and optimization. In general, network planning refers to the process of designing a network structure and determining network elements. Network optimization, in turn, refers to finding a network configuration to achieve peak performance. In this regard, optimization includes achieving the best possible results from the network elements (e.g., antenna systems). A baseline antenna system setting may be determined, such as, an azimuth setting and a tilt setting, based on planning and optimizing the wireless communications network. Optimization of antenna systems can further be facilitated by remote configuration functionality.

Remote azimuth steering/horizontal adjustment (RAS) and remote electrical tilt/vertical adjustment (RET) provide for adjusting azimuth and tilt settings for an antenna. By way of example, antenna azimuth refers to the horizontal angle between the north and the antenna's main lobe direction. Antenna azimuth may influence service coverage as well as overlap. Adjusting antenna azimuth, for example, can significantly reduce cell overlap while sacrificing coverage. Less cell overlap, in turn, improves inter-cell and intra-cell interference, power consumption, and capacity. Antenna tilt is the angle of the main beam of an antenna below the horizontal plane. It is measured in degrees and can have positive and negative values. Positive values mean that the beam is directed downwards; the procedure is called down-tilting, and the tilt value is referred to as downtilt. Negative values mean that the beam is directed upwards; the procedure is uptilting, and the tilt value becomes uptilt. A tilt value of 0° shows that the direction of the main beam is parallel to the ground and points towards the horizon. Downtilting an antenna may reduce inter-cell interference in order to increase the relative strength of signals from the home cell. Interference reduction increases cell capacity and improves performance of the entire network.

With heterogeneous networks of macrocells, femtocells, and picocells and consequently changing network parameters (e.g., changing traffic patterns), a single optimal configuration to support a network at all times is virtually impossible. Conventional optimization processes fail to account for changing network parameters when configuring the settings for azimuth and tilt of antenna systems. As such, the optimal configuration for azimuth and tilt of antenna systems in a network should be based on changing real-time measurements of the network parameters.

Embodiments of the present invention provide an efficient method for dynamically optimizing the azimuth and tilt settings of antenna systems, based on analyzing network parameters. Analyzing network parameters may be by an automated feedback mechanism, where network parameters include, by way of example, changing traffic patterns, radio channel conditions, capacity offload requirements, and coverage requirements. The network parameters are associated with antenna systems in a wireless communications network. In embodiments, the antenna systems of macrocells may be selectively targeted for azimuth and tilt setting adjustments to the exclusion of femtocells and picocells. Optimal configuration of azimuth and tilt for antenna systems in the wireless communications network can be based on real-time measurements of network parameters that change frequently. For example, in a wireless communications network, the traffic characteristics are dynamically changing, and the optimum azimuth and tilt will therefore vary as well. As such, dynamically optimizing the azimuth and tilt settings of an antenna system in the wireless communications network provides for optimal performance of the network. In particular, the network includes the capacity to dynamically adjust the azimuth settings and tilt settings based on an optimization policy that includes a baseline antenna system setting. In one embodiment, an eNodeB utilizes RAS and RET functionalities of the antenna system to dynamically change the azimuth and tilt settings based on the network parameter measurements.

Self-Organizing Networks (SON) provides a platform for performing dynamic optimization of antenna systems. SON is an automation technology designed to make the planning, configuration, management, optimization, and healing of mobile radio access networks simpler and faster. SON functionality and behavior can function with LTE networks and also retro-fitted to older radio access technologies. In particular, SON self-optimization process is defined as a process where the mobile device and eNodeB measurements and performance measurements are used to auto-tune the network. The self-optimization process collects measurement information from the mobile device and eNodeBs and then with the help of external optimization tool (e.g., RAS and RET) it auto-tunes the configuration data to optimize the network. In particular, the SON component may include a control interface module that functions to adjust the azimuth using RAS and adjust the tilt using RET.

SON may be implemented with different types of architectures, for example, network management level centralized SON, Element Management level centralized SON, Distributed SON, and Hybrid SON. It is contemplated that embodiments of the present invention can function within either type of architectural implementation of SON. As such, embodiments of the present invention integrate remote configuration of antenna system settings into a SON component of the network such that antenna system settings are dynamically optimized. In embodiments, optimizing antenna systems is based on an optimization policy having a baseline antenna system setting associated with threshold levels for network parameters. Any variations and combinations thereof are contemplated with embodiments of the present invention.

In an exemplary embodiment, a wireless communications network includes a macrocell, femtocell, and picocell, each supporting one or more mobile devices. Each of these cells can be associated with one or more antenna systems. The wireless communications network includes an SON component that performs network optimization tasks, including, adjusting antenna systems. Network optimization may be based on an optimization policy. The optimization policy defines the actions and procedures for configuring the optimal antenna system settings. The optimization policy can include baseline antenna system settings and threshold levels for one or more network parameters of the baseline antenna system settings. An antenna system supporting the network may be configured with a baseline antenna system setting having an azimuth setting and a tilt setting.

The baseline antenna system setting may function within threshold levels. A baseline antenna system setting may be associated with events coverage, seasonal propagation changes, or even daily traffic variations. The baseline antenna system setting includes threshold levels that trigger adjustments of the azimuth setting, the tilt setting, or both. For example, network parameters can include traffic patterns, radio channel conditions, capacity offload, and coverage requirements. Using the SON component, an automated feedback mechanism is implemented that provides measurements of the network parameters for the macrocell, femtocell, and picocell. In embodiments, the SON component is integrated into an eNodeB. The SON component for the antenna system can receive network parameter measurements for one or more of the exemplary network parameters. Network parameter measurements may be received from mobile devices and/or eNodeBs. The SON component is configured to make a determination, based on received measurements of the network parameters, whether to make adjustments to the azimuth setting, tilt setting, or both.

In the case where a baseline antenna system setting has been configured with threshold levels, when the network parameter measurement meets and/or exceeds the threshold levels, a determination is made for adjustments to the antenna. For example, a threshold level for the traffic pattern network parameter may be a 30% change (e.g., increase) from the baseline network parameter. In this regard, when the measured traffic pattern shows an increase greater than 30%, the eNodeB makes a determination whether to make an adjustment. It is contemplated that the network parameters can be evaluated individually, in combination, or using a flow chart that evaluates the network parameters in a predefined priority rank.

Accordingly, in a first aspect of the present invention, computer-readable media having computer-executable instructions embodied thereon that, when executed, enable a computing device to perform a method for dynamically optimizing the azimuth and tilt settings of antenna systems based on analyzing network parameters. The method includes receiving network parameter measurements for one or more cells in a network. The network parameter measurements are associated with an antenna system. Each of the network parameter measurements corresponds to network parameters in an optimization policy. The method also includes determining that a network parameter measurement deviates from a corresponding network parameter in the optimization policy. The method further includes determining an adjustment for an azimuth setting and a tilt setting for the antenna system. The method includes adjusting the azimuth setting and the tilt setting for the antenna system based on the adjustment determined.

In a second aspect of the present invention, a system for dynamically optimizing the azimuth and tilt settings of antenna systems based on analyzing network parameters is provided. The system comprises a Self-Organizing Network (SON) Component configured for configuring a baseline antenna system setting having an azimuth setting and a tilt setting for an antenna system. The baseline antenna setting is associated with an optimization policy for adjusting the azimuth setting and the tilt setting of the antenna system. The SON component is also configured for receiving network parameter measurements for a plurality of heterogeneous cells in the network. The network parameter measurements correspond to network parameters each having threshold levels defined in the optimization policy. The SON component is also configured for identifying at least two network parameters based on the optimization policy. The SON component is further configured for determining an adjustment for the azimuth setting and the tilt setting for the antenna system having the baseline antenna setting based on a network parameter measurement of at least one of the two network parameters meeting a threshold level. The SON component is further configured for adjusting the antenna based on the azimuth setting and the tilt setting.

In a third aspect of the present invention, a method for dynamically optimizing the azimuth and tilt settings of antenna systems based on analyzing network parameters is provided. The method includes configuring a baseline antenna system setting having an azimuth setting and a tilt setting for an antenna system. The baseline antenna setting is associated with an optimization policy having threshold levels for adjusting the azimuth setting and the tilt setting of the antenna system. The method includes receiving network parameter measurements for a plurality of heterogeneous cells in a network. The network parameter measurements correspond to network parameters each having threshold levels defined in the optimization policy. The method also includes identifying at least one network parameter from the network parameters based on the optimization policy. The method further includes determining an adjustment for the azimuth setting and the tilt setting for the antenna system having the baseline antenna setting based on a network parameter measurement of the at least one network parameter meeting a threshold level. The method includes adjusting the antenna based on the azimuth setting and the tilt setting.

Turning now to FIG. 1, a block diagram of an illustrative mobile device is provided and referenced generally by the numeral 100. Although some components are shown in the singular, they may be plural. For example, mobile device 100 might include multiple processors or multiple radios, etc. As illustratively shown, mobile device 100 includes a bus 110 that directly or indirectly couples various components together including memory 112, a processor 114, a presentation component 116, a radio 117, input/output ports 118, input/output components 120, and a power supply 122.

Memory 112 might take the form of one or more of the aforementioned media. Thus, we will not elaborate more here, only to say that memory component 112 can include any type of medium that is capable of storing information in a manner readable by a computing device. Processor 114 might actually be multiple processors that receive instructions and process them accordingly. Presentation component 116 includes the likes of a display and a speaker, as well as other components that can present information (such as a lamp (LED), or even lighted keyboards).

Radio 117 represents a radio that facilitates communication with a wireless telecommunications network. Illustrative wireless telecommunications technologies include Long Term Evolution (LTE) and Evolved Data Optimized (EVDO) and the like. In some embodiments, radio 117 might also facilitate other types of wireless communications including Wi-Fi communications.

Input/output port 118 might take on a variety of forms. Illustrative input/output ports include a USB jack, stereo jack, infrared port, proprietary communications ports, and the like. Input/output components 120 include items such as keyboards, microphones, touchscreens, and any other item usable to directly or indirectly input data into mobile device 100. Power supply 122 includes items such as batteries, fuel cells, or any other component that can act as a power source to power mobile device 100.

FIG. 2A depicts an illustrative operating environment, referenced generally by the numeral 200, which enables a method for dynamically optimizing the azimuth and tilt settings of antenna systems based on analyzing network parameters. The operating environment 200 includes a mobile device 202, access components 206, a wireless communications network 208 and an SON Component 210. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Mobile device 202, in one embodiment, is the type of device described in connection with FIG. 1 herein. Mobile device 202 may communicate with a wireless communications network or other components not internal to the mobile device 202. In embodiments, mobile device 202 may make and receive telephone calls over a radio link while moving around wide geographic areas. In addition, mobile device 202 may support a wide variety of other services (e.g., text messaging, MMS, e-mail, Internet access, short-range wireless communication, applications, and gaming). Mobile device 202 communicates with access components 206 by way of a communications link 204. Communications link 204 may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi connection to a device (e.g., mobile hotspot) that provides access to a wireless communications network, such as a WLAN connection using 802.11 protocol. A long-range connection may include a connection using one or more of CDMA, GSM, TDMA, LTE, and 802.16. Mobile device 202 may connect to the wireless communications network through different types of cells. In particular, mobile device 202 can use femtocells or picocells such that mobile device 202 communicates through a broadband Internet connection such as a digital subscriber line or cable.

Generally, the access components 206 provide access to what some skilled artisans refer to as a wireless communications network 208, also termed a core network. A wireless communications network 208 may comprise one or more of the components illustrated in FIG. 2. Not all components that make up a wireless communications network are shown. Also, not all connections or possible connections are shown. The access components 206 may be one or more of a base transceiver station (BTS), a Wi-Fi router, a mobile hotspot, a switch and any other device that facilitates communication between mobile device 202 and network 208. In one embodiment, the access components 206 include both a Wi-Fi router and a BTS tower. In another embodiment, access components 206 may be BTS towers. A radio network controller (RNC) (not shown) performs various functions, such as managing radio channels, power control, load control, admission control, packet scheduling, handover control, macrodiversity, security functions, and mobility management. A base station controller (BSC) (not shown) acts as the intelligence behind base transceiver stations (BTS) (not shown), and handles allocation of radio channels, receives measurements from mobile devices, and controls handovers from one BTS to another BTS.

In particular, each eNodeB is connected by a link using an interface. For example, an S1 interface may allow for communication between eNodeB to higher-level entities including MME (not shown) and the S-GW (not shown). The Si interface may be used for managing the system and sending control signaling to other nodes, particularly eNodeBs, in the network. Each eNodeB also hosts additional layers that include additional functionality. The eNodeB also performs many functions including radio resource management, admission control, scheduling, enforcement of negotiated UL/DL QoS, cell information broadcast, ciphering/deciphering of user and control plane data, and compression/decompression of user plane packet headers. In this regard, the eNodeB in combination with the mobile device 202 may facilitate receiving and processing network parameter measurements for a plurality of network parameters.

With continued reference to FIG. 2A, the SON component 210 is responsible for managing various functions that are used to dynamically adjusting an azimuth setting and tilt setting of antenna systems. The SON component 210 configures and optimizes the network automatically to reduce human interaction and increase the capacity of the network. SON may be implemented with different types of architectures, for example, network management level centralized SON, Element Management level centralized SON, Distributed SON, and Hybrid SON. It is contemplated that embodiments of the present invention can function within either type of architectural implementation of SON.

At a basic level, the SON component 210 is integrated with the capacity to remotely adjust antenna settings (e.g., using RAS and RET). In particular, the SON component 210 can dynamically adjust azimuth and tilt settings of antenna systems based on analyzing network parameters that trigger decision points of an optimization policy. Dynamically adjusting the antenna systems operates based on the optimization policy managed at least in part at the SON component 210. The SON component 210 functions include self-configuration, self-healing and self-optimization. It is contemplated that any of these functions may utilize the integrated capacity to adjust antenna system settings. For example, the self-configuration process is defined as the process where newly deployed nodes are configured for automatic installation procedures to get the necessary basic configuration for system operations. Self-configuration includes basic setup and initial radio configuration. When a new eNodeB is introduced into the network, the self-configuring function of the SON component 210 may, within embodiments of the present invention, allow for adjusting azimuth settings and tilt settings. It is contemplated that the SON component 210 may configure the existing eNodeB only or in combination with the newly introduced eNodeB in the network. Any variations and combination of self-configuration by adjusting azimuth settings and tilt setting are contemplated with embodiments of the present invention.

The SON component 210 may self-configure a baseline antenna system setting. The baseline antenna system setting may also be manually configured during a planning phase of network design. The baseline antenna system setting whether self-configured or manually configured is integrated into the optimization policy. In embodiments, baseline antenna system settings are associated with events coverage, seasonal propagation changes, or even daily traffic variations. FIG. 3A illustrates an exemplary baseline antenna system setting with several different baseline 302 configurations and an azimuth 304 and a tilt 306 for each setting. A setting X 308 and Y 310 for the azimuth and tilt respectively can be associated with a particular baseline configuration A. As discussed in more detail below, each baseline antenna system setting includes network parameters and threshold levels such that when a particular baseline antenna system setting is active, the decisions for adjustments are based on the baseline system antenna settings.

With regard to the self-healing function, the self-healing function aims to automatically detect and localize failures and apply self-healing mechanisms to solve several failure classes. Similar to self-configuration, self-healing can utilize the functionality of dynamic adjustment of azimuth and tilt settings of antenna systems when a failure occurs. For example, if an eNodeB were to fail in the network, the network parameter measurements would change. In this regard, the self-healing function can adjust the antenna system settings, in addition to other self-healing actions to mitigate the impact of the loss.

In embodiments, the SON component 210 is accessible via a computing device (not shown). Computing device generally refers to a general purpose device comprising hardware and software required to perform a set of arithmetic or logical operations. In one embodiment, computing device is the type of device described in FIG. 1 herein. The computing device may function to provide an administrator with an interface for configuring the functions of the SON component described herein. For example, an administrator may manually update an optimization policy that the SON component 210 uses to optimize the antenna system settings. The computing device may further be used to manage aspects of the SON component 210. Any variations and combination of interface and management functions via the computing device are contemplated with embodiments of the present invention.

Figure 2B:
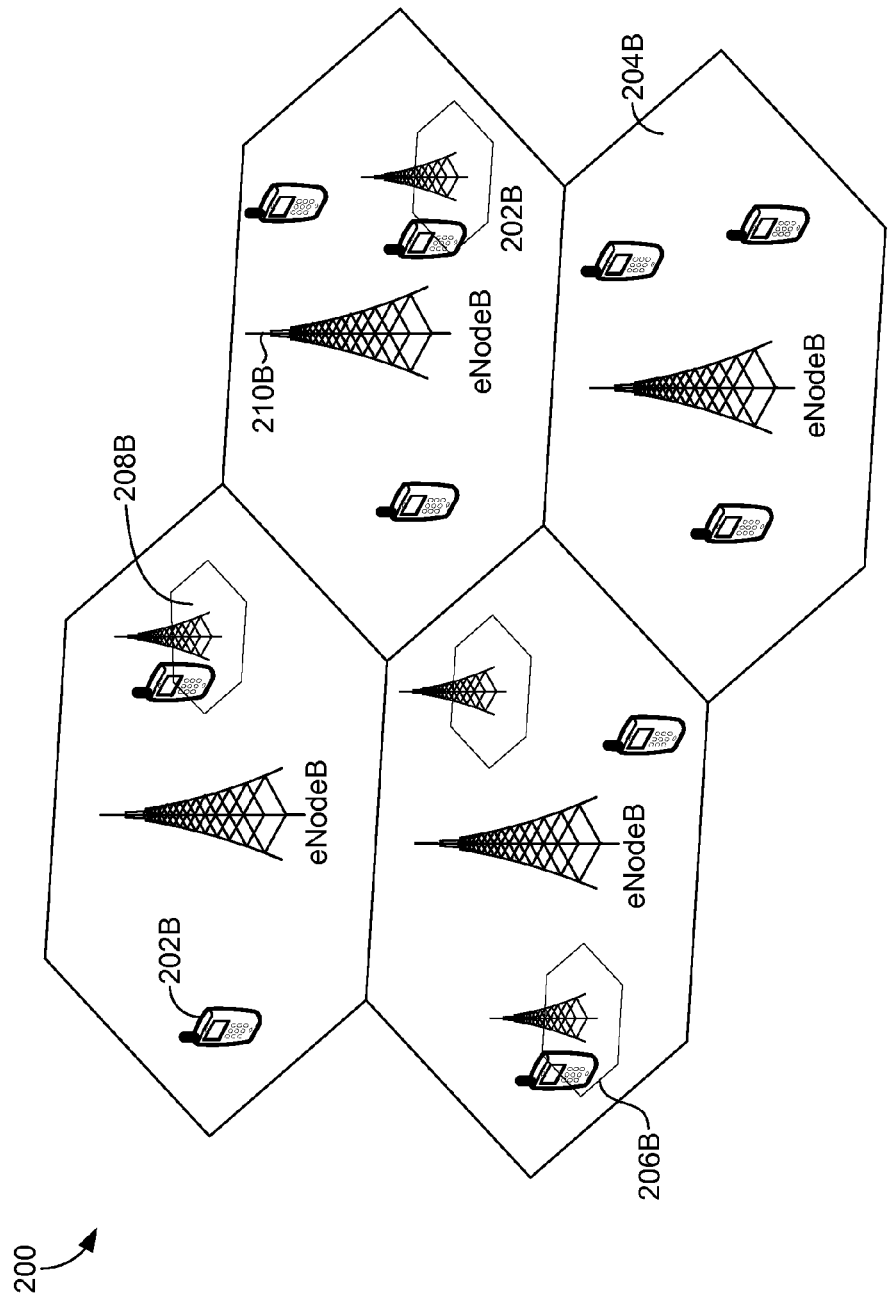

The SON component 210 is generally responsible for self-optimization. Self-optimization is defined as, a process where network parameter measurements are used to optimize the network. For example, the mobile device 202 and the eNodeB measurements and performance measurement are used to auto-tune the network. In particular, embodiments of the present system integrate the capacity to remotely adjust azimuth and tilt settings of antenna systems in the network based on the network parameter measurements. With reference to FIG. 2B, a wireless communications network includes a macrocell 204B, femtocell 206B, and picocell 208B, each supporting one or more mobile devices 202B. Each of these cells is associated with one or more antenna systems 210B. The wireless communications network includes an SON component (not shown) that performs network optimization tasks, including adjusting antenna systems. As discussed above, the SON component may be implemented using different types of architectures, as such, SON component is merely exemplary. For purposes of a detailed discussion, the SON component is described herein as integrated into an eNodeB.

With continued reference to FIGS. 3A-3C, network optimization may be based on an optimization policy. The optimization policy defines the actions and procedures for configuring the optimal antenna system settings. The optimization policy can include baseline antenna system settings and threshold levels for one or more network parameters of the baseline antenna system settings. For example, Baseline A 312 includes network parameters 314, a baseline factor 316, network parameter measurements 318, threshold levels 320, and priority rank 322. The traffic pattern network parameter may have a baseline factor at 50% that denotes, by way of example; the traffic is at 50% capacity. The percentage baseline factor as used herein is for exemplary purposes and should not limit the scope of the present invention. The traffic pattern as measured using the mobile device 202B and/or eNodeB measures at 82% capacity. In embodiments, a threshold level is associated with each network parameter such that when the threshold level is met and/or exceeded, an action is triggered.

Further, a priority rank 322 may also be included in a baseline antenna system setting such that an order of evaluation can be implemented. Selecting the priority rank for each type of network parameter may be based on assessing the tradeoffs. For example, traffic patterns may be prioritized over coverage requirements such that adjustments provide for better network measurements for traffic patterns over coverage requirements. In embodiments, the priority rank 322 may further be implemented such that evaluation of one or more top-order network parameters may preclude evaluation of one or more bottom-order network parameters. For example, evaluation of a top order parameter may lead to an adjustment that generates network parameter measurements within acceptable threshold levels for all network parameters, thus rendering additional evaluation moot. It is further contemplated that the network parameters may be evaluated in combination with each other and this triggers a single recommendation for adjustments to the azimuth settings and tilt setting. Any variations and combinations of evaluation ordering are further contemplated with embodiments of the present invention.

With continued reference to FIG. 3C, network parameters (324, 326, 328, 330, 332 and 334) trigger actions for adjustments to the azimuth and tilt settings based on network measurements at particular instances. Each measurement instance (336, 338, 340, 342, and 344) yields an adjustment result for both the azimuth and tilt. FIG. 3C is discussed merely for exemplary purposes and is not intended to limit the scope of the present invention. For example, the adjustment results used herein have values yes and no; however, it is contemplated that actual adjustment values can be generated based on the measurements of network parameters in order to optimize the azimuth and tilt settings. In measurement instance 336, the traffic pattern is greater than a 30% factor over the baseline, while the radio channel conditions and capacity offload are the same as the baseline. The coverage is at a 90% factor. As mentioned, these factors can be compared to threshold values and/or evaluated as standalone readings to make a determination of whether to make adjustments to the azimuth and tilt settings. In the measurement instance 336, the azimuth will be adjusted but not the tilt. As shown in the other exemplary measurement instances, different deviations from a baseline factor of each network parameter are determined based on network parameter measurements, as such, triggering different types of antenna system setting adjustments.

Figures 4, 5:
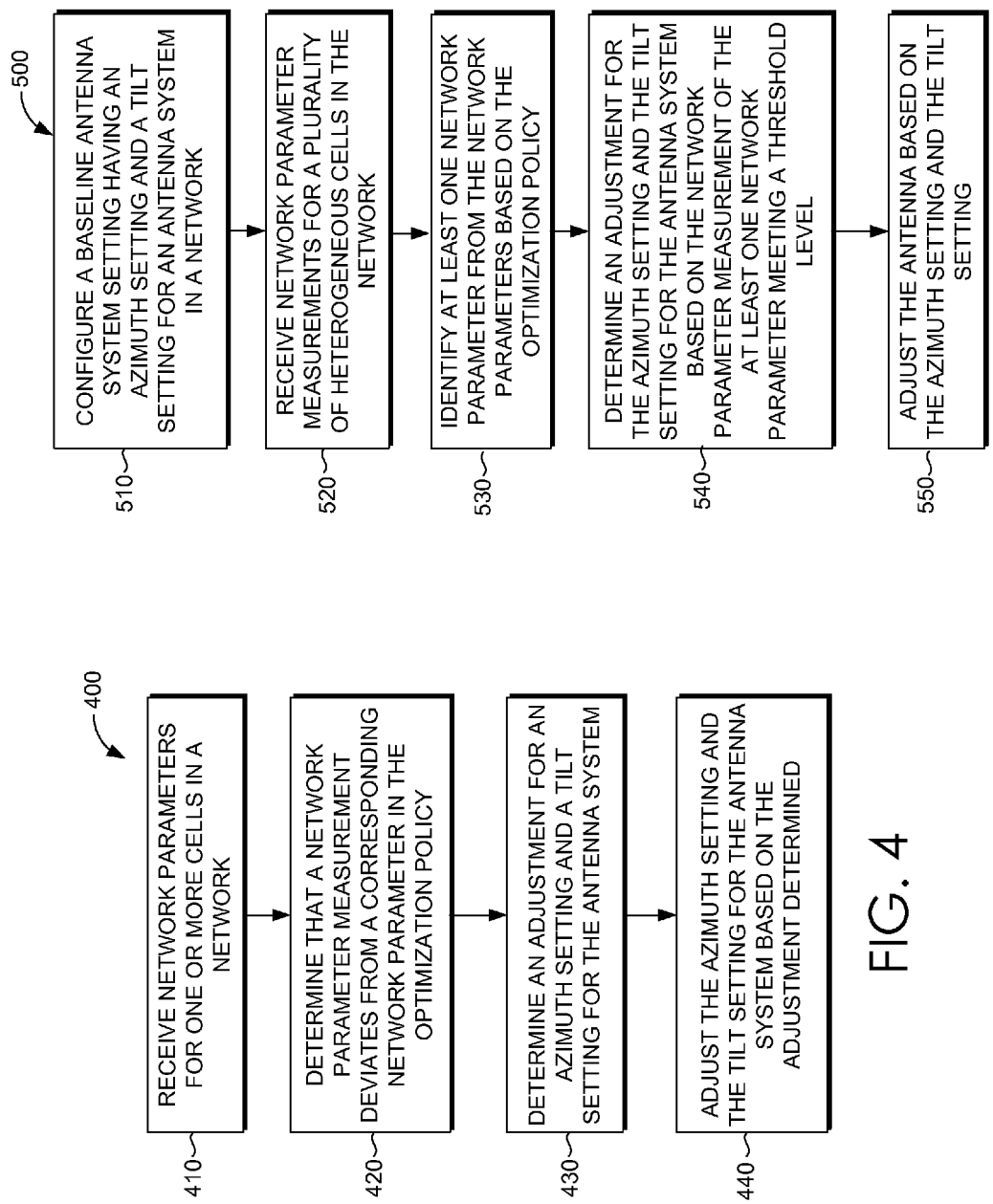
FIG. 4 depicts a flow chart illustrating a method for dynamically optimizing the azimuth and tilt settings of antenna systems based on analyzing network parameters, in accordance with an embodiment of the present invention.
FIG. 5 depicts a flow chart illustrating a method for dynamically optimizing the azimuth and tilt settings of antenna systems based on analyzing network parameters, in accordance with an embodiment of the present invention.

Referring to FIG. 4, a flowchart illustrates a method 400 for dynamically optimizing the azimuth and tilt settings of antenna systems based on analyzing network parameters. Initially, at step 410, network parameter measurements for one or more cells in a network are received. The network parameter measurements are associated with an antenna system. Each of the network parameter measurements corresponds to network parameters in an optimization policy. The network may include one or more heterogeneous cells such as macrocells, picocells, and femtocells. In one embodiment, the optimization policy includes a baseline antenna system setting for the antenna system. The baseline antenna system setting may include threshold levels of network parameters. The threshold levels may be used in embodiments where actions are triggered not solely by standalone network parameter measurement but also the network parameter measurement meeting or exceeding the threshold levels.

At step 420, it is determined that a network parameter measurement for at least one of the network parameter measurements deviates from a network parameter in the optimization policy. The optimization policy includes a baseline antenna system setting that determines the network parameter measurement deviates from the optimization policy. At step 430, an adjustment for an azimuth setting and a tilt setting for the antenna system is determined. In one embodiment, for each network parameter measurement it is determined that the network parameter measurement deviates from the baseline antenna setting based on a threshold level, then it is determined whether the azimuth setting is adjusted, and then it is determined whether the tilt setting is adjusted. At step 440, the azimuth setting and the tilt setting for the antenna system are adjusted based on the adjustment determined.

FIG. 5 depicts a flowchart illustrating a method 500 for dynamically optimizing the azimuth and tilt settings of antenna systems based on analyzing network parameters. At step 510, a baseline antenna system setting having an azimuth setting and a tilt setting for an antenna system is configured. The baseline antenna setting is associated with an optimization policy having threshold levels for adjusting the azimuth setting and the tilt setting of the antenna system. At step 520, the network parameter measurements for a plurality of heterogeneous cells in a network are received. The network parameter measurements correspond to network parameters each having threshold levels defined in the optimization policy. In embodiments, it is further contemplated that the threshold levels can be dynamically altered. The threshold levels may be altered based on a self-optimization process, self-configuration process, and a self-healing process. Self-optimization is triggered based on change in network parameter measurements; self-configuration is triggered based on an addition of an access component to the network; and self-healing is triggered based on a loss of an access component in the network. It is contemplated that an administrator may also periodically alter the threshold levels.

At step 530 at least one of the network parameters is identified. Identifying the at least one network parameter from the network parameters is based on a predefined priority rank in the optimization policy, wherein adjustments are made based on one or more top-order network parameters that preclude evaluation of one or more bottom-order network parameters. At step 540, an adjustment for the azimuth setting and the tilt setting is determined for the antenna system having the baseline antenna setting based on at least network parameters meeting a threshold level corresponding to the at least one network parameter. At step 550, the antenna is adjusted based on the azimuth setting and the tilt setting.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. Non-transitory computer-readable media having computer-executable instructions embodied thereon that, when executed, enable a computing device to perform a method for dynamically optimizing the azimuth and tilt settings of antenna systems based on analyzing network parameters, the method comprising:

receiving network parameter measurements for one or more cells in a network, the network parameter measurements are associated with an antenna system, wherein each of the network parameter measurements corresponds to network parameters in an optimization policy;

determining that a network parameter measurement deviates from a corresponding network parameter in the optimization policy, wherein the optimization policy comprises at least a baseline antenna system setting that facilitates determining that the network parameter measurement deviates from the baseline antenna system setting;

determining an adjustment for an azimuth setting and a tilt setting for the antenna system based on:
(1) determining that the network parameter measurement deviates from the baseline antenna system setting for the network parameter based on a threshold level;
(2) determining whether the azimuth setting is adjusted; and
(3) determining whether the tilt setting is adjusted; and
adjusting the azimuth setting and the tilt setting for the antenna system based on the adjustment determined.

2. The media of claim 1, wherein the one or more cells includes at least one cell selected from the following:
a macrocell;
a picocell; and
a femtocell.

3. The media of claim 2, wherein the one or more cells includes at least the macrocell and one other non-macro-type cell.

4. The media of claim 1, wherein the network parameters include at least two of the following:
   traffic patterns;
   radio channel conditions;
   capacity offload requirements; and
   coverage requirements.

5. The media of claim 1, wherein the optimization policy defines actions and procedures for configuring an optimal antenna system.

6. The media of claim 1, wherein determining the adjustment for the azimuth setting and the tilt setting for the antenna system is further based on for each network parameter measurement of the network parameter measurements:
   (1) determining that the network parameter measurement deviates from the baseline antenna system setting for a corresponding network parameter based on a threshold level of the corresponding network parameter;
   (2) determining whether the azimuth setting is adjusted; and
   (3) determining whether the tilt setting is adjusted.

7. The media of claim 1, wherein the baseline antenna system settings are dynamically altered, wherein altering the baseline antenna system setting comprises at least updating the threshold levels based on requirements of the network.

8. The media of claim 1, wherein the baseline antenna system settings are periodically altered by an administrator, wherein altering the baseline antenna system setting comprises at least updating the threshold levels based on requirements of the network.

9. A system for dynamically optimizing the azimuth and tilt settings of antenna systems based on analyzing network parameters, the system comprising:
   a Self-Organizing Network (SON) Component configured for:
   configuring a baseline antenna system setting having an azimuth setting and a tilt setting for an antenna system in a network, wherein the baseline antenna system setting is associated with an optimization policy for adjusting the azimuth setting and the tilt setting of the antenna system;
   receiving network parameter measurements for a plurality of heterogeneous cells in the network, wherein the network parameter measurements correspond to network parameters each of the network parameters having threshold levels defined in the optimization policy;
   identifying at least two network parameters based on the optimization policy;
   determining an adjustment for the azimuth setting and the tilt setting for the antenna system having the baseline antenna setting based on:
   (1) determining that at least one of the two network parameters meets the threshold level;
   (2) determining whether the azimuth setting is adjusted; and
   (3) determining whether the tilt setting is adjusted;
   adjusting the antenna based on the azimuth setting and the tilt setting using remote azimuth steering (RAS) and remote electrical tilt (RET) respectively.

10. The system of claim 9, wherein determining the adjustment for the azimuth setting and the tilt setting further comprises:
    for each network parameter measurement of the network parameter measurements:
    (1) determining that the network parameter measurement meets the threshold level of the corresponding network parameter;
    (2) determining whether the azimuth setting is adjusted; and
    (3) determining whether the tilt setting is adjusted.

11. The system of claim 10, wherein each network parameter is evaluated based on a predefined priority rank in the optimization policy, wherein adjustments made on one or more top order network parameters preclude evaluation of bottom order network parameters.

12. The system of claim 9, wherein the SON component is further configured for self-configuration and self-healing, wherein self-configuration and self-healing comprise dynamically adjusting the azimuth setting and the tilt setting of one or more antenna systems.

13. The system of claim 12, wherein the SON component is further configured for dynamically altering the baseline antenna system settings.

14. The system of claim 13, wherein dynamically altering the baseline antenna system settings comprises altering the threshold levels of one or more network parameters based at least in part on one selected from the following:
    self-optimization, wherein self-optimization is triggered based on a change in network parameter measurements;
    self-configuration, wherein self-configuration is triggered based on an access component to the network; and
    self-healing, wherein self-healing is triggered based on an access component in the network.

15. A method for dynamically optimizing the azimuth and tilt settings of antenna systems based on analyzing network parameters, the method comprising:
    configuring a baseline antenna system setting having an azimuth setting and a tilt setting for an antenna system in a network, wherein the baseline antenna setting is associated with an optimization policy having threshold levels for adjusting the azimuth setting and the tilt setting of the antenna system, wherein the threshold levels are dynamically altered based at least in part on one of the following:
    (1) self-optimization, wherein self-optimization is triggered based on change in network parameter measurements;
    (2) self-configuration, wherein self-configuration is triggered based on an addition of an access component to the network; and
    (3) self-healing, wherein self-healing is triggered based on a loss of an access component in the network;
    receiving network parameter measurements for a plurality of heterogeneous cells in the network, wherein the network parameter measurements correspond to network parameters each having threshold levels defined in the optimization policy;
    identifying at least one network parameter from the network parameters based on the optimization policy;
    determining an adjustment for the azimuth setting and the tilt setting for the antenna system having the baseline antenna setting based on the network parameter measurement of the at least one network parameter meeting a threshold level; and
    adjusting the antenna based on the azimuth setting and the tilt setting, using remote azimuth steering (RAS) and remote electrical tilt (RET) respectively.

16. The method of claim 15, wherein identifying the at least one network parameter of the network parameters is based on a predefined priority rank in the optimization policy, wherein adjustments made based on one or more top-order network parameters preclude evaluation of one or more bottom-order network parameters.

17. The method of claim 15, wherein the plurality of heterogeneous cells includes at least one cell selected from the following:
- a macrocell;
- a picocell; and
- a femtocell.

18. The method of claim 17, wherein the plurality of heterogeneous cells includes at least the macrocell and one other non-macro-type cell.

19. The method of claim 15, wherein the optimization policy defines actions and procedures for configuring an optimal antenna system.

20. The method of claim 15, wherein the network parameters include at least one of the following:
- traffic patterns;
- radio channel conditions;
- capacity offload requirements; and
- coverage requirements.

\* \* \* \* \*